US011422675B1

(12) United States Patent
Abdul Kadar et al.

(10) Patent No.: US 11,422,675 B1
(45) Date of Patent: Aug. 23, 2022

(54) MULTI-LEVEL STRATEGY-BASED DYNAMIC CONTENT GENERATION

(71) Applicant: Amazon Technologies, Inc., Seattle, WA (US)

(72) Inventors: Feroz Abdul Kadar, Irvine, CA (US); Adrian Ross Bell, Seattle, WA (US); Erik Thomas Kerkhoven, Seattle, WA (US); Andre Wyatt, Seattle, WA (US); Navid Harandi, Trabuco Canyon, CA (US); Shanil Daya, Irvine, CA (US); Alejandro Nicolas Dos Reis, Placentia, CA (US); Jovani Alvarado, Aliso Viejo, CA (US); Xiaojian Chen, Irvine, CA (US); Ben Hoelzel, Rancho Santa Magarita, CA (US); Autumn Wozniak, Los Osos, CA (US); Gitesh Yatin Patel, Aliso Viejo, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 226 days.

(21) Appl. No.: 16/834,468

(22) Filed: Mar. 30, 2020

(51) Int. Cl.
*G06F 3/048* (2013.01)
*G06F 3/0482* (2013.01)

(52) U.S. Cl.
CPC ................... *G06F 3/0482* (2013.01)

(58) Field of Classification Search
None
See application file for complete search history.

(56) References Cited

U.S. PATENT DOCUMENTS

| | | | |
|---|---|---|---|
| 10,462,508 B2 * | 10/2019 | Jung | H04N 21/251 |
| 2008/0040341 A1 * | 2/2008 | York | G06Q 30/0633 |
| 2010/0191619 A1 * | 7/2010 | Dicker | G06Q 30/0633 705/26.1 |
| 2012/0096013 A1 * | 4/2012 | Ciancutti | G06F 16/907 707/749 |
| 2012/0310771 A1 * | 12/2012 | Selinger | G06Q 30/0631 705/26.7 |
| 2017/0287044 A1 * | 10/2017 | Rose | H04L 67/306 |

* cited by examiner

*Primary Examiner* — William C Trapanese
(74) *Attorney, Agent, or Firm* — Thomas | Horstemeyer, LLP

(57) ABSTRACT

Disclosed are various embodiments for providing a unique user experience for a user account interacting with an electronic commerce site by dynamically generating content that is organized and presented according to various strategies (e.g., past purchases, trending items, advertisements, etc.) and/or a user context for a given shopping experience. For example, a user associated with a user account can be presented one or more grouping of items (e.g., products, goods, services, digital content, etc.) that are ranked and presented to the user according to the various strategies and the user context such that the user is presented with content that is most relevant and determined to be of interest to the particular user.

20 Claims, 11 Drawing Sheets

MULTI-LEVEL STRATEGY-BASED DYNAMIC CONTENT GENERATION

BACKGROUND

An electronic commerce system may include listings of items (e.g., products, goods, services, digital content, etc.) offered for sale, lease, download, rent, etc., by many different merchants. Users may use the electronic commerce system to purchase, lease, download, rent, etc., items of interest. In some instances, as a user navigates through different network pages of the electronic commerce system, the user may miss certain items of interest by failing to visit network pages associated with those items or the user may end up navigating to dead-ends without realizing that he or she missed other network pages of interest.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1A:
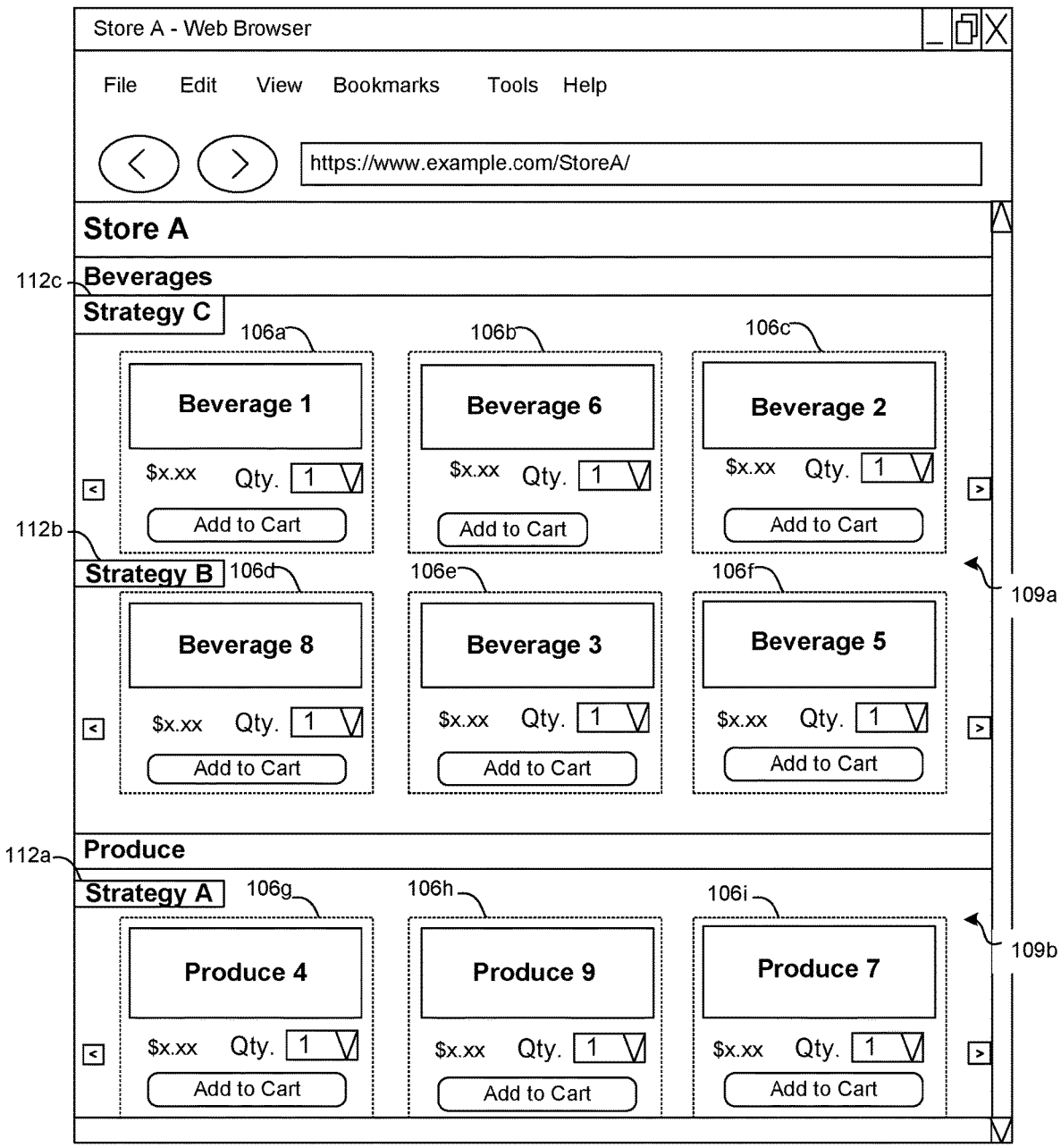
FIGS. 1A and 1B are pictorial diagrams of example user interfaces illustrating examples of content being organized for a user account according to different strategies and user context according to various embodiments of the present disclosure.

The present disclosure relates to providing a unique user experience for a user account interacting with an electronic commerce site by dynamically generating content that is organized and presented according to various strategies (e.g., past purchases, trending items, advertisements, etc.) and/or a user context for a given shopping experience. For example, a user associated with a user account can be presented with one or more grouping of items (e.g., products, goods, services, digital content, etc.) that are ranked and presented to the user according to the various strategies and the user context such that the user is presented with content that is most relevant and determined to be of interest to the particular user. According to various embodiments, user accounts interacting with the electronic commerce system can each be provided a different interactive experience that is uniquely tailored for a specific user account according to type and arrangement of the content that is presented to each user associated with the user account.

According to various embodiments, items can be presented to a user through the use of aisles. An aisle is a dynamically generated grouping of items. For example, similar to a grocery store where different items are arranged in different grocery aisles, the aisles presented to the user via a user interface may include items associated with a particular item category (e.g., beverages, dairy, produce, etc.). In some examples, an aisle may also include items that are not included in a given item category but are determined to be included in the grouping of items according to other factors (e.g., complementary items, items on sale, etc.). According to various embodiments, the selection and arrangement of items within an aisle can be determined according to a user context and/or selected strategies. In some embodiments, the arrangement of the aisles as well as other types of content (e.g., advertisements, vendor provided content, recommendations, etc.) can be determined according to the user content and/or selected strategies, thereby providing the user with a unique shopping experience that is tailored to his or her determined interest for a given user context.

A user context can be based on a variety of factors including, for example, store brand, store type (e.g., physical vs. online), location, region, user eligibility status (e.g., membership status, included in an invite-only list, etc.), current store section (e.g., what product categories or aisle is the user currently browsing), type of page the customer is viewing (e.g., item detail page, store front page, search result page, etc.), user interaction history (e.g., purchase history, browsing history, viewing history, search history, rating history, etc.), interaction behavior during an active shopping experience (e.g., searching behavior, browsing behavior, and add to cart behavior), aggregate interaction behavior (e.g., multiple user interaction behavior), item availability (e.g., inventory, delivery capacity), event notice (e.g., emergency, road closure, etc.), time (e.g., date, year, week, day), seasonality, a predefined list of items associated with a user account, and/or other factors. According to various embodiments, an analysis of these factors can be used to determine a user context that can define an interactive experience for a user during a given shopping experience. For example, the user context can be used for the selection of items, the arrangement of the items, the arrangement of aisles, the arrangement of additional content, the selection of strategies, and/or other actions required to uniquely tailor a shopping experience for a user account.

In addition to the user context, various strategies can be used to organize and present personalized content associated with a user account during a given shopping experience. As such, strategy-based selection of items and arrangement of content can provide a user account a personalized and unique interactive experience that is tailored to the determined interest of the user associated with the particular user account. A strategy can included a specific approach for selecting items or other types of content to present to the user associated with the user account at a given time. According to various examples, a strategy may correspond to a characteristic associated with items available for purchase, lease, rent, download, etc., via interactions with the electronic commerce system. The characteristics may include, for example, past purchases, trending items, items on sale, advertisements, popular items, complementary items, and/or other type of item characteristics or strategy as can be appreciated. When selecting items to present to a customer based on a given strategy, only those items that correspond to the strategy will be selected. For example, when the strategy is based on "trending items," only those items that are currently trending will be selected.

According to various examples, different types of strategies can be selected and ranked according to the user context. For example, a user account may be known to be interested in past purchases but is known not to interact much with advertisements. As such, the types of strategies can be ranked and presented to the user such that the items associated with the more relevant strategies are presented to the user prior to the presentation of items associated with the least relevant strategies. In some examples, the user can be presented an aisle (e.g., a grouping of items) that includes items that are organized according to a given strategy. In some examples, an item listing may include a badging or other type of indication that informs the user of the strategy associated with the presented item listing.

Turning now to FIG. 1A, shown is an example user interface 103a that includes item listings (e.g., 106a, 106b, 106c, 106d, 106e, 106f, 106g, 106h, 106i) arranged in aisles 109 (e.g., 109a, 109b) to allow a user to browse through items that are available for purchase, lease, rent, download, etc., according to various embodiments of the present disclosure. In addition to being arranged in an aisle 109, the item listings are further arranged according to a given strategy 112 (e.g., 112a, 112b, 112c). The item listings 106 can correspond to items (e.g., products, goods, services, digital content, etc.) that are determined to be relevant and/or of interest to the user according to the user context and/or strategies 112. An item listing can comprise an item image, an item price, an add-to-cart component, a one-click purchase component (not shown), a select quantity component, an item name, and/or other item attribute or selectable component as can be appreciated. In some embodiments, the items listings 106 can comprise a selectable region, that in response to user interaction (e.g., selection, hover action, etc.), can be configured to redirect the user to a user interface that provides additional information about the given product. In some examples, a user interaction with the selectable region can generate a pop-up box or other user interface element (e.g., drop down box, inline expansion component, etc.) that can be generated and presented to the user with additional information about the item without redirecting the user to a different network page or other interface 103.

According to various embodiments, the different aisles 109 that can be presented to a particular user can be ranked and selected according to the user context. For example, one user account may be presented a beverage aisle 109, a produce aisle 109, and a snack aisle 109 that are arranged in a similar order. However, the aisles 109 presented to another user may differ in type and/or arrangement. For example, another user may be presented a produce aisle 109, a dairy aisle 109, and a beverage aisle 109. As such, the arrangement of aisles 109 that can be presented in a user interface 103 is dynamic according to a determined user context.

According to various embodiments, the different strategies 112 for selecting items in a given aisle 109 can be selected, ranked according to user context, and arranged according to the ranking. For example, a user context may be analyzed to determine that a user associated with a user account may be more interested in a strategy 112 for past purchases than a strategy 112 for trending items. As such, the item listings 106 associated with the strategy 112 for past purchases by be arranged higher than the item listings 106 included in the strategy 112 for trending items.

In addition to ranking and arranging the aisles 109 and strategies 112 according to a user context, the item listings 106 selected to be presented can further be ranked and arranged according to the ranking. According to various examples, the item listings 106 that are included in a particular aisle 109 and/or strategy 112 can be ranked according to a user context and arranged in the aisle 109 according to the ranking. FIG. 1A illustrates an example of a user interface 103a where the aisles 109 are arranged according to a determined interest to the user account, the strategies 112 are selected and arranged according to a determined interest to the user account, and the presented item listings 106 are selected and arranged according to a determined interest to the user account.

Figure 1B:
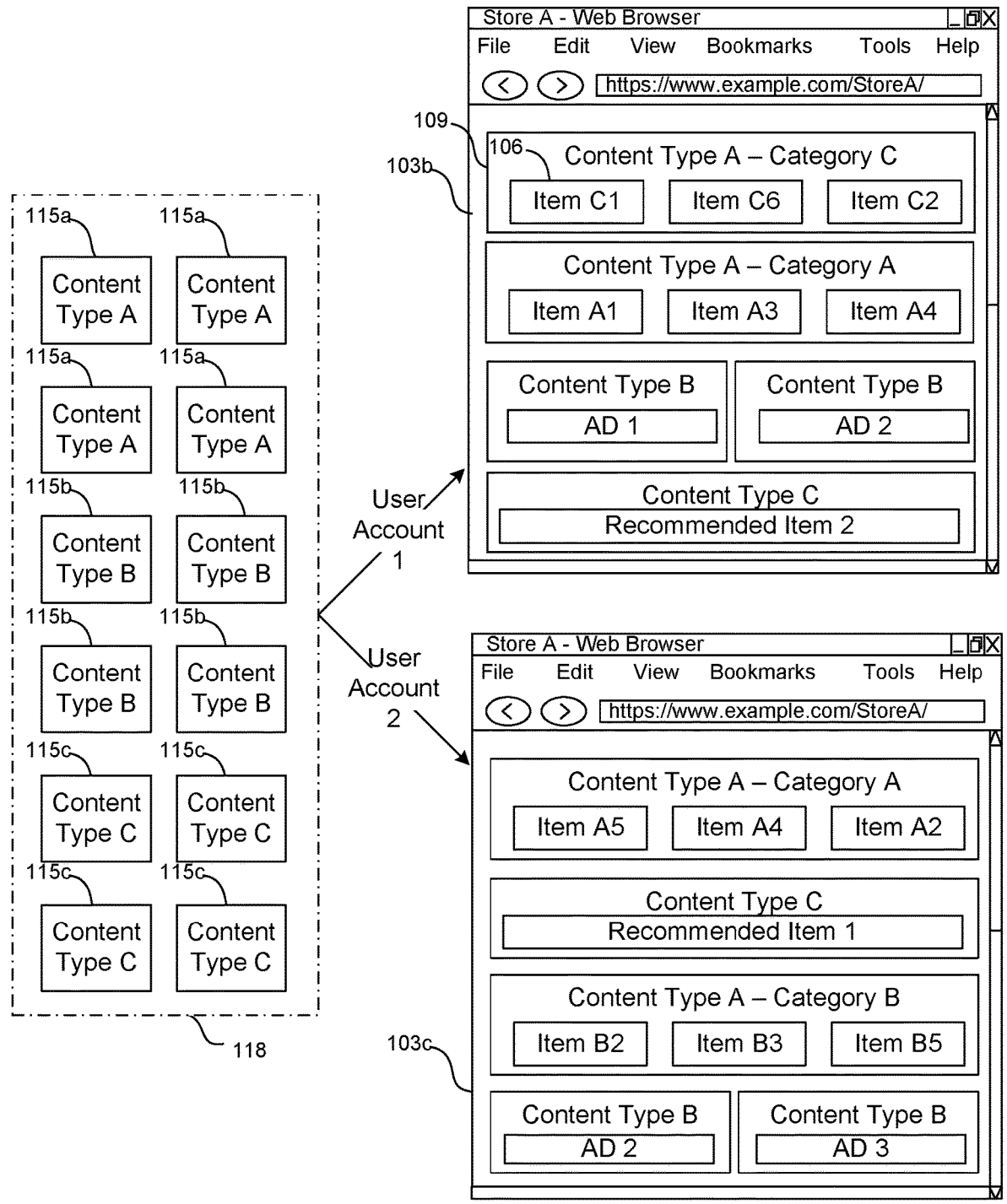

Referring next to FIG. 1B, shown are example user interfaces 103 (e.g., 103b, 103c) that include different types of content 115 (e.g., 115a, 115b, 115c) uniquely arranged for a given user account in according to various embodiments of the present disclosure. For example, a user may be presented content 115 that includes a selection of aisles 109 (e.g., a grouping of items, categories, etc.), advertisements, recommendations, vendor-provided content, and/or other type of content 115. The different types of content 115 can be selected and ranked such that the higher ranked content of interest to the user account (e.g., most relevant) is presented above the lowest ranked content of interest to the user account (e.g., least relevant).

In the example, of FIG. 1B, the Content Type A may correspond to an aisle 109. As can be appreciated, the item listings 106 that may be included in Content Type A may be selected and arranged according to strategies 112 and/or relevance to the user account according to various embodiments. In addition, according to various embodiments, the different types of content 115 can be ranked and arranged for a given user account. In some examples, for each type of content, the content 115 corresponding to the given type of content can be ranked according to the user context and/or strategy 112. As such, for a given user account the content 115 in the content library 118 can be first ranked among content for a given content type and then ranked again for all types of content 115.

As shown in FIG. 1B, each user account can be presented a different arrangement of content 115 in a user interface 103. Assume that the user interfaces 103 of FIG. 1B correspond to a landing page for Store A. Instead of the content 115 on the landing page being statically arranged such that the same types of content (e.g., dairy aisle, advertisement 1, produce aisle, recommendation 1, etc.) are presented in the same arrangement, the content 115 is selected from the content library 118 and ranked and uniquely arranged for each user account. As such, the user associated with the user account can be presented a user interface 103 that provides tailored content according to the interests of the user associated with the user account.

As one skilled in the art will appreciate in light of this disclosure, certain embodiments may be capable of achieving certain advantages, including some or all of the following: (1) reducing computer resource utilization (e.g., memory consumption, processor utilization, network transfer, etc.) by avoiding the need to individually search an online catalog for items of interest; (2) improving the user experience in interacting with a computer system by automatically identifying content of interest to the user, so the user does not waste his or her time ending up at dead-ends without finding desired items; (3) improving the functioning of the computing system through a more streamlined purchasing process that reduces user frustration when searching for other items; (4) improving the user experience in interacting with a computer system by providing a dynamically generated user interface with a unique layout tailored to the interests of the user to allow the user to easily access relevant items for a given context; and so forth. In the following discussion, a general description of the system and its components is provided, followed by a discussion of the operation of the same.

Figure 2:
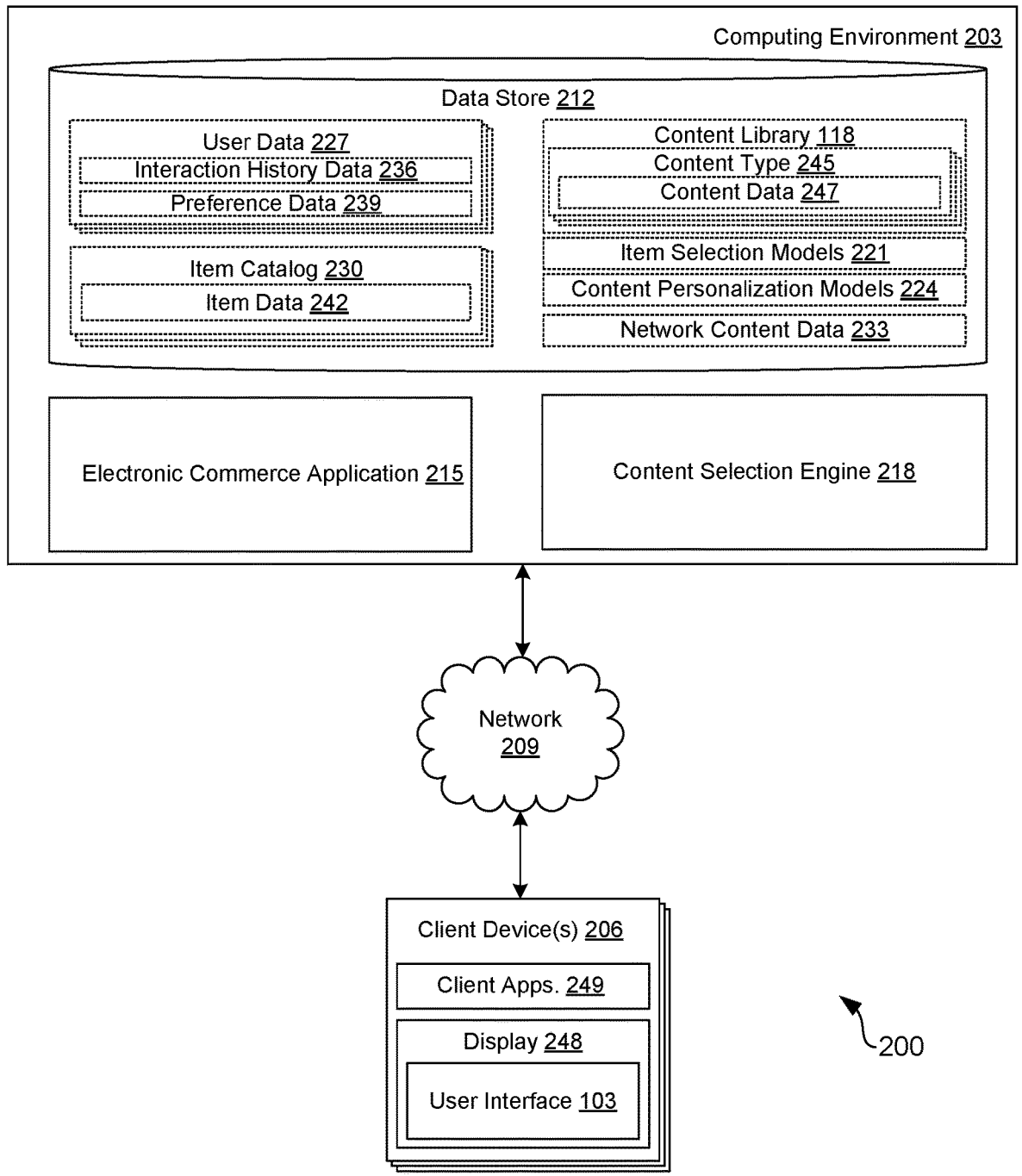
FIG. 2 is a schematic block diagram of a networked environment according to various embodiments of the present disclosure.

With reference to FIG. 2, shown is a networked environment 200 according to various embodiments. The networked environment 200 includes a computing environment 203 and a client device(s) 206, which are in data communication with each other via a network 209. The network 209 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed on the computing environment 203, for example, include the electronic commerce application 215, the content selection engine 218, and other applications, services, processes, systems, engines, or functionality not discussed in detail herein. The electronic commerce application 215 is executed to facilitate the online sale, download, lease, rent, etc. of items from one or more electronic commerce systems over the network 209. Such items may include products, goods, services, digital content, and/or other items. The electronic commerce application 215 also performs various backend functions associated with the online presence of an electronic commerce system in order to facilitate the online purchase of items. For example, the electronic commerce application 215 generates network pages such as, for example, web pages and/or other types of network content that are provided to client devices 206 for the purposes of promoting and selecting items for purchase, rental, download, lease, or any other forms of consumption.

The content selection engine 218 is executed to determine a user context for a user account during a given shopping experience via interactions with the electronic commerce application 215. In addition, the content selection engine 218 can identify strategies 112 to apply for the selection and arrangement of content 115 to include in a user interface 103 presented to a user. The user context can be based on a variety of factors including, for example, store brand, store type (e.g., physical vs. online), location, region, user eligibility status (e.g., membership status, included in an invite-only list, etc.), current store section (e.g., what product categories or aisle is the user currently browsing), type of page the customer is reviewing (e.g., item detail page, store front page, search result page, etc.), user interaction history (e.g., purchase history, browsing history, viewing history, search history, rating history, etc.), interaction behavior during an active shopping experience (e.g., searching behavior, browsing behavior, and add to cart behavior), aggregate interaction behavior (e.g., multiple users interaction behavior), item availability (e.g., inventory, delivery capacity), event notice (e.g., emergency, road closure, etc.), time (e.g., date, year, week, day), seasonality, a predefined list of items associated with a user account, and/or other factors.

In addition, the content selection engine 218 can select strategies 112 according to the user context that can be used to select item listings 106 within the user interface 103. The content selection engine 218 can further rank and determine the arrangement of content 115 (e.g., strategies 112, item listings 106, aisles 109, etc.) according to the selected strategies 112, the user context, item selection models 221, content personalization models 224, and/or other factors and models as can be appreciated.

The data stored in the data store 212 includes, for example, user data 227, an item catalog 230, a content library 118, item selection models 221, content personalization models 224, network content data 233, and potentially other data.

The user data 227 includes various data collected from or generated by users and/or customers having accounts in an electronic commerce site facilitated by the electronic commerce application 215. The user data 227 may include interaction history data 236, preference data 239, account address(es), payment instrument data, authentication information, and/or other data associated with a user or user account of the electronic commerce site.

The interaction history data 236 may include information specific to a user account such as, for example, a purchase history (including purchase frequency, purchase cadence, purchase recency, etc.), a browsing history, a viewing history, a rating history, a search history, and/or other information that reflects a prior interaction by the user account with the computing environment 203. The preference data 239 may include information related to preferences of items, item attributes, brands of items, quality of items, quantity of items, and/or other information.

The item catalog 230 includes item data 242 regarding items offered through the electronic commerce application 215. Such items may include products, goods, services, digital content, and/or other items that can be offered for sale, lease, rent, download, etc. The items in the item catalog 230 may be organized according to a taxonomy of categories. For example, the items in the item catalog 230 may be categorized according to an item type with various item attributes further defining a placement of an item in the taxonomy. For example, milk and cheese can include two branches of the taxonomy under a category for "dairy." Further, the category associated with milk, for example, may further include branches according to type, flavoring, fat percentage, organic features, and so on.

The item data 242 may include item attributes, an item identifier, descriptions, weights, prices, quantities available, export restrictions, customer reviews, customer ratings, images, videos, version information, availability information, shipping information, and/or other data. Item attributes can include specific characteristics that define a given item. For example, item attributes can include size, color, weight, packaging, quantity, freshness, ripeness, nutritional values, how the item is processed, brand, seasonality (e.g., fall, winter, spring, summer, holidays, etc.), associated activities (e.g., celebration, weddings, picnics, sporting events, etc.), hazardous classification, fragility, import/export restrictions, and/or other attributes as can be appreciated.

The content library 118 may include content 115 that can be included in a given user interface 103 and selected for inclusion by the content selection engine 218. The content 115 can include different content types 245 such as aisles 109 (e.g., a grouping of item listings 106, categories, etc.), advertisements, recommendations, vendor-provided content, and/or other types of content 115. The content library 118 can include content data 247 which includes the data to be presented. For example, if the content corresponds to an advertisement, the content data 247 can include any type of images, text, etc., that is to be included in the user interface 103. The content data 247 can further include attributes and/or characteristics associated with the content 115 that can be used as factors by the item selection models 221 and/or content personalization models 224 in determining an appropriate ranking and arrangement for the content 115 within the user interface 103.

The item selection models 221 include rules, models, and/or configuration data for the various algorithms or approaches employed by the content selection engine 218. For example, the item selection models 221 can include the various models and/or algorithms for determining strategies 112 to apply for item selection and the selection of items for inclusion for a given aisle 109, recommendation, and/or other type of content. The item selection models 221 can determine weights that can be applied to the different strategies 112 according to the user context. As such, a score can be determined for each strategy 112 and a top-ranked subset for the strategies 112 can be selected for inclusion.

The content personalization models 224 include rules, models, and/or configuration data for the various algorithms or approaches employed by the content selection engine 218. For example, the content personalization models 224 can include the various models and/or algorithms for ranking and determining an order of presentation for the various types of content 115 to be included in a user interface. In some examples, the content personalization models 224 can be used to generate scores for the different aisles 109 to present to the user, according to the user context. In addition, the content personalization models 224 can be used to generate scores for the different content types 245. The calculated scores can be ranked and used to determine an order of presentation of the content 115 included in a given user interface 103.

The network content data 233 may include various data employed by the electronic commerce application 215 and/or the content selection engine 218 in generating user interfaces 103, and/or other network pages. The network content data 233 may include hypertext markup language (HTML), extensible markup language (XML), cascading style sheets (CSS), images, text, audio, video, templates, and/or other data.

The client device 206 is representative of a plurality of client devices that may be coupled to the network 209. The client device 206 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head mounted displays, voice interface devices, or other devices. The client device 206 may include a display 248. The display 248 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 206 may be configured to execute various applications such as a client application 249 and/or other applications. The client application 249 may be executed in a client device 206, for example, to access network content served up by the computing environment 203 and/or other servers, thereby rendering a user interface 103 on the display 248. To this end, the client application 249 may comprise, for example, a browser, a dedicated application, etc., and the user interface 103 may comprise a network page, an application screen, etc. The client device 206 may be configured to execute applications beyond the client application 249 such as, for example, email applications, social networking applications, word processors, spreadsheets, and/or other applications.

Figure 3A:
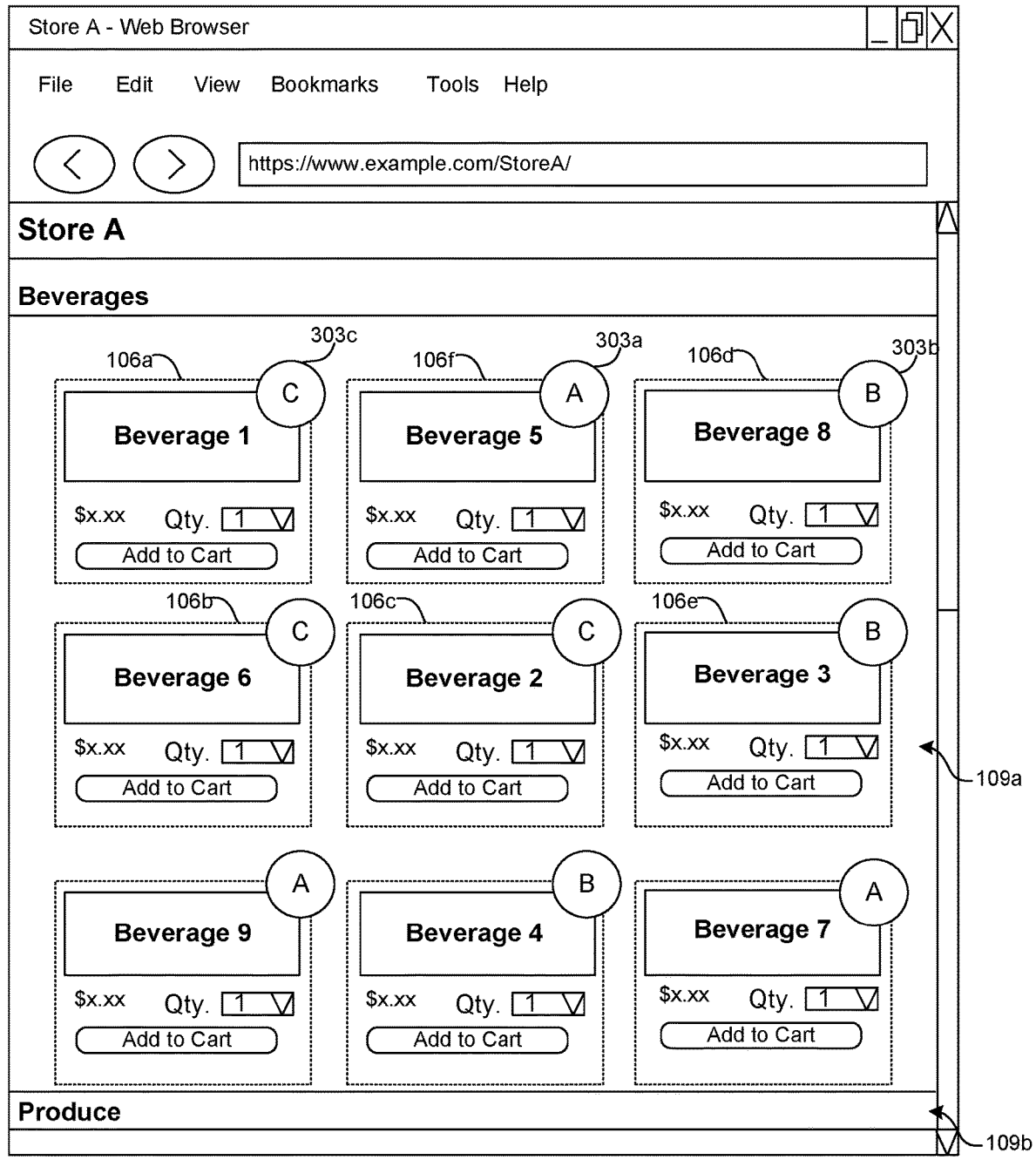
FIGS. 3A-3C are pictorial diagrams of example user interfaces rendered by a client device in the networked environment of FIG. 2 according to various embodiments of the present disclosure.
Figure 3B:
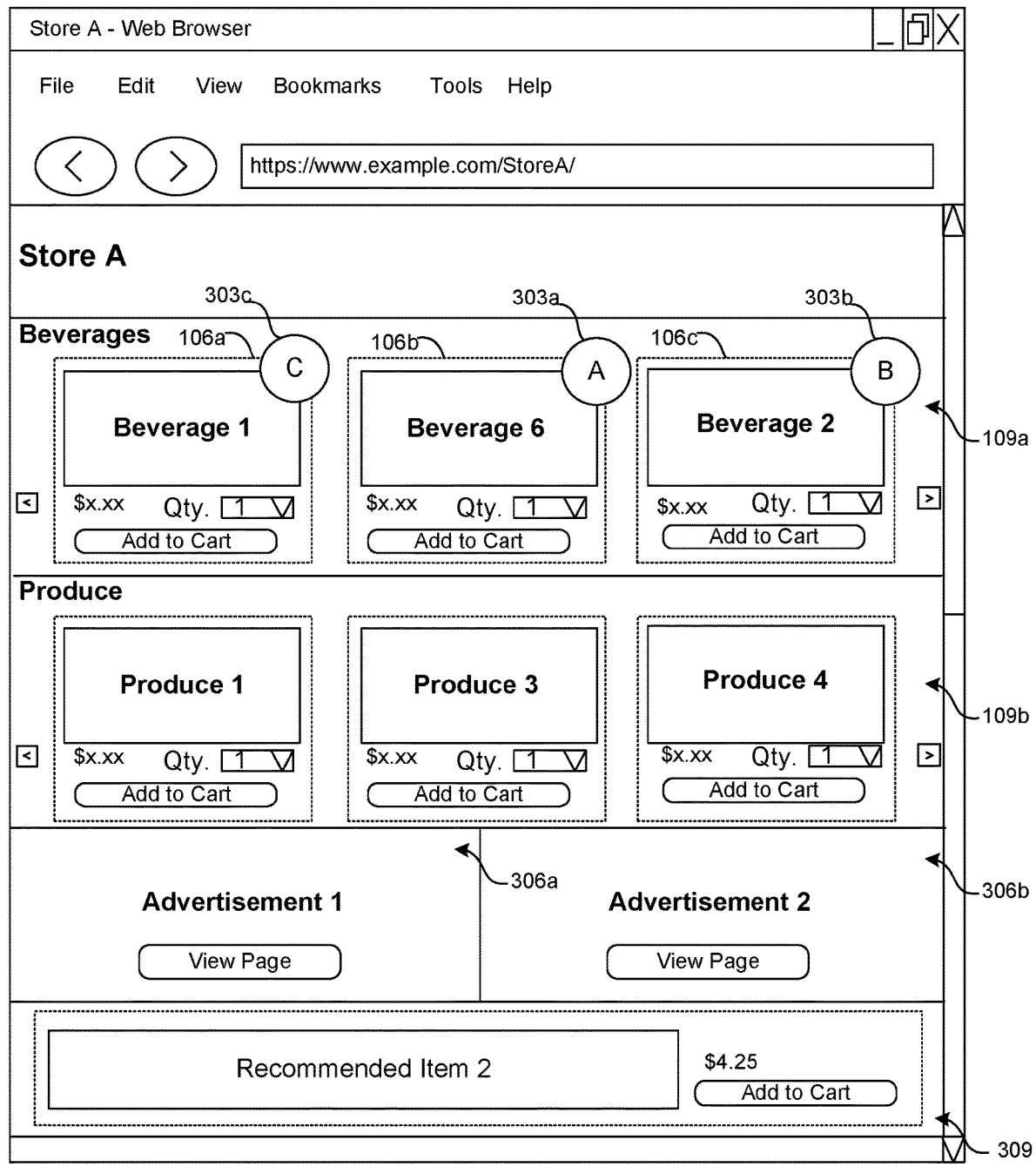
Figure 3C:
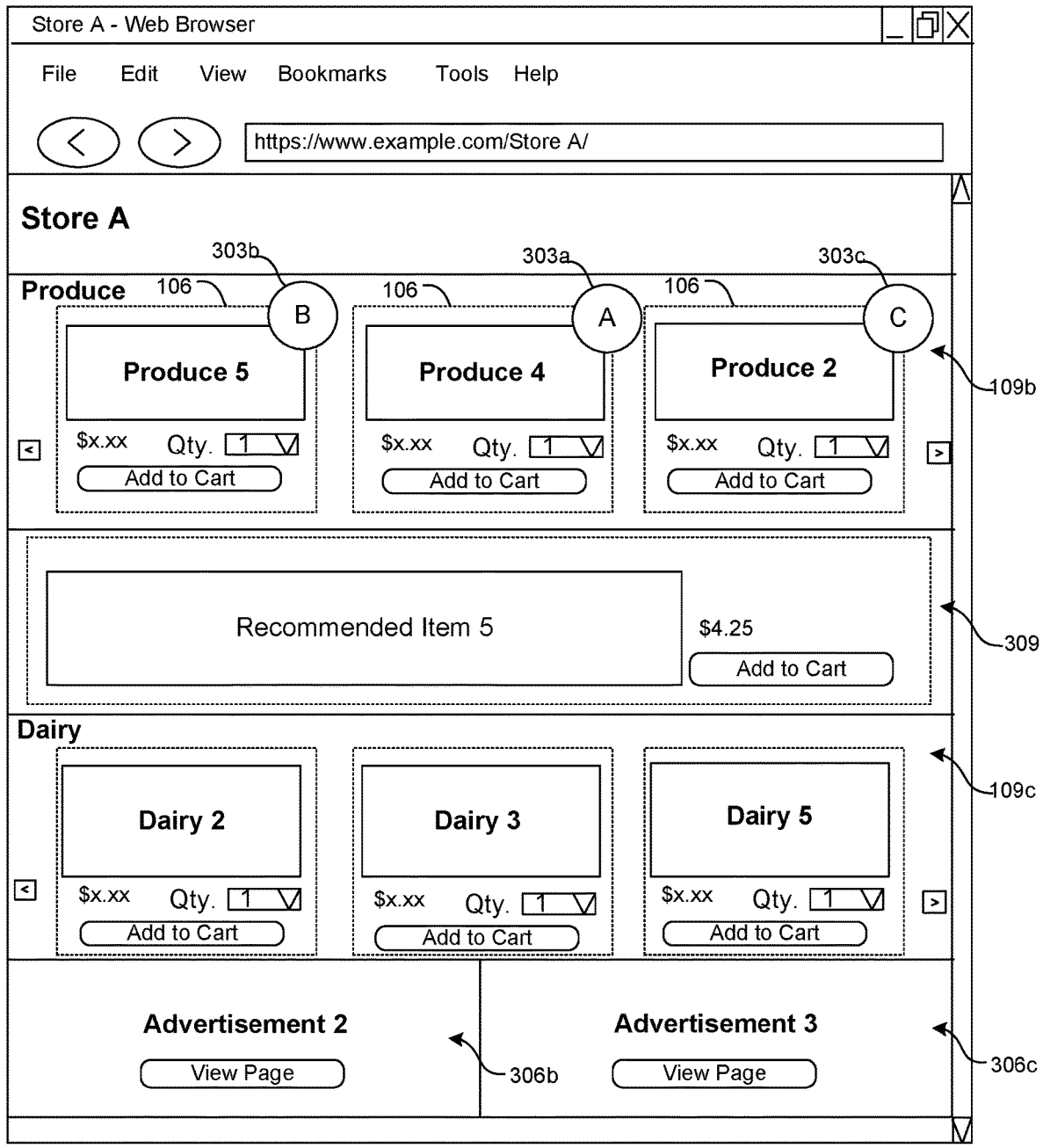

Referring next to FIG. 3A-3C, shown are example user interfaces 103 (e.g., 103d, 103b, 103c) rendered by the client device 206 according to various embodiments of the present disclosure. To begin, FIG. 3A illustrates an example user interface 103d that is similar to that of FIG. 1A with respect to item listings 106 being included in an aisle 109 and arranged with respect to a given strategy 112. Unlike the example user interface 103a of FIG. 1A where the item listings 106 are arranged in sections defined by the strategies 112, the user interface 103d includes a grid of item listings 106 that is not presented in a grouping according to a given strategy 112. Rather, the item listings 106 are selected and arranged according to relevance and a determined interest to the user, and include a badge 303 (e.g., 303a, 303b, 303c) that provides a visual indication of the corresponding strategy 112 that the item listing 106 may be associated with. The badge 303 may included a visual icon that represents a given strategy 112.

Turning now to FIG. 3B, shown is an example user interface 103b that corresponds to the user interface 103b illustrated in FIG. 1B according to various embodiments of the present disclosure. In particular, the user interface 103b includes different types of content 115 that are selected and arranged in a user interface layout based at least in part on the user context, selected strategies 112, item selection models 221, content personalization models 224, and/or other factors or models as can be appreciated. As shown in FIG. 3B, the user interface 103b includes a beverage aisle 109a, a dairy aisle 109b, a first advertisement 306a, a second advertisement 306b, and a recommendation 309. The ordering and placement of each of the different content types 245 is determined according to the ranking of both the individual content types 245 and all the available types of content 115 using scores assigned to the different content 115 based at least in part on the user context and/or other data. In addition, the user interface 103b includes badges 303 on the item listings 106 to indicate a type of strategy 112 used to select the presented item listing 106.

Referring next to FIG. 3C, shown is an example user interface 103c that corresponds to the user interface 103c illustrated in FIG. 1B according to various embodiments of the present disclosure. The example user interface 103c is generated for a user account that is different than the user account associated with the example user interface 103b of FIG. 3B. In particular, the selection and arrangement of the content 115 in FIG. 3C differs from that in FIG. 3B as the interests and relevancy of items for the user account of FIG. 3C may differ. In FIG. 3B, the user interface 103b presents the selected content 115 for the corresponding user account such that the order of presentation includes the beverage aisle 109a followed by the produce aisle 109b, a first advertisement 306a, a second advertisement 306b, and a recommendation 309, the user interface 103c presents different types of content that are arranged according to the user context for the given user account.

In contrast, the user interface 103c, which may correspond to the same type of page for the electronic commerce site (e.g., store landing page, aisle landing page, past purchases page, etc.) may include content 115 arranged such that the order of presentation includes the produce aisle 109b followed by a recommendation 309, a dairy aisle 109c, the second advertisement 306b, and a third advertisement 306c. As shown in the comparison of FIGS. 3B and 3C, the user account associated with the user interface 103b of FIG. 3B may be determined to be more impacted by advertisements which is why the advertisements 306 included in FIG. 3B are shown in a higher placement than the advertisements 306 included in FIG. 3C.

Figure 4:
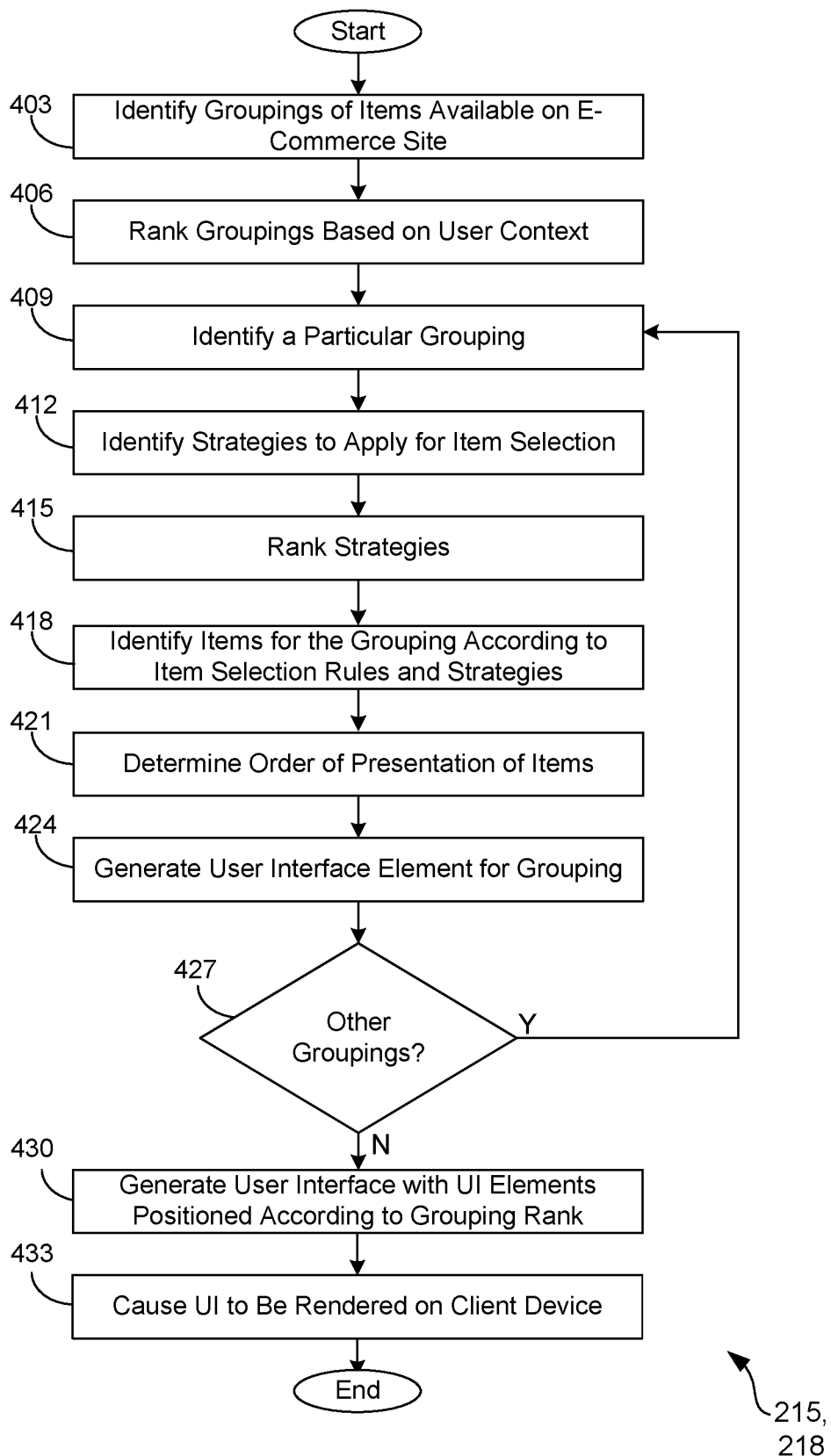
FIGS. 4-6 are flowcharts illustrating examples of functionality implemented as portions of an electronic commerce application and a content selection engine executed in a computing environment in the networked environment of FIG. 2 according to various embodiments of the present disclosure.

Referring next to FIG. 4, shown is a flowchart that provides one example of the operation of portions of the electronic commerce application 215 and the content selection engine 218, according to various embodiments. It is understood that the flowchart of FIG. 4 provides merely an example of the many different types of functional arrangements that may be employed to implement the operation of the portions of the electronic commerce application 215 and the content selection engine 218, as described herein. As an alternative, the flowchart of FIG. 4 may be viewed as depicting an example of elements of a method implemented in the computing environment 203 (FIG. 2) according to one or more embodiments.

Beginning with box 403, the content selection engine 218 identifies groupings of items available for purchase, lease, rent, download, etc. through the electronic commerce application 215. For example, the groupings of items may correspond to different categories of items as defined by the taxonomy of the item catalog 230. In this example, the groupings of items may correspond to "dairy items," "produce items," "beverages," "snacks," etc. In some examples, items that may not be included in a given category but are considered to be a complementary item to an item in a given category may still be included in a particular grouping of items. In another example, an item that may be on sale may be selected to be part of a grouping even though the item may not be associated with a particular item category.

At box 406, the content selection engine 218 can rank the groupings based at least in part on a determined user context. The user context can be based on a variety of factors including, for example, store brand, store type (e.g., physical vs. online), location, region, user eligibility status (e.g., membership status, included in an invite-only list, etc.), current store section (e.g., what product categories or aisle is the user currently browsing), type of page the customer is reviewing (e.g., item detail page, store front page, search result page, etc.), user interaction history (e.g., purchase history, browsing history, viewing history, search history, rating history, etc.), interaction behavior during an active shopping experience (e.g., searching behavior, browsing behavior, and add to cart behavior), aggregate interaction behavior (e.g., multiple users interaction behavior), item availability (e.g., inventory, delivery capacity), event notice (e.g., emergency, road closure, etc.), time (e.g., date, year, week, day), seasonality, a predefined list of items associated with a user account, and/or other factors. According to various embodiments, an analysis of these factors can be used to determine a user context that can be used to define an interactive experience for a user during a given shopping experience.

Upon identifying the user context, the content selection engine 218 can use the content personalization models 224 to determine a score for the different types of identified groupings. For example, the content personalization models 224 may include weights that can be assigned to various groupings and/or user context factors to determine a score for the individual groupings. To further this example, for a given user account assume that the user associated with the user account is a vegetarian and rarely purchases items in a grouping for meats. As such, based on knowledge about the user, the score associated with grouping associated with meat may be lower than a score associated with a grouping associated with produce. According to various embodiments, the different identified groupings of items can be ranked according to an assigned score.

At box 409, the content selection engine 218 identifies a particular grouping. For example, the grouping may comprise a highest ranked grouping of items. The grouping can also be randomly selected from the grouping of items that has not yet been analyzed.

At box 412, the content selection engine 218 can identify strategies 112 to apply for selection of items in the grouping. According to various examples, the item selection models 221 can include strategies 112 that may be selected according to a given user context. For example, a strategy 112 associated with past purchases may be selected due to a known behavior by the user account to frequently repurchase items. Similarly, a strategy 112 associated with advertisements may not be selected as the user context may identify that the user typically fails to interact with advertisements.

At box 415, the content selection engine 218 can rank the strategies 112 according to various embodiments of the present disclosure. For example, the item selection models 221 may include weights that can be applied to the various strategies 112 in order to generate a score for each strategy 112. The score that can be associated with each strategy 112 can reflect a likelihood that the user account will be reactive to the given strategy based at least in part on the user context. In various examples, the strategies 112 can be ranked according to an assigned score.

At box 418, the content selection engine 218 can identify items for the grouping according to the item selection models 221 and the strategies 112. For example, the grouping may correspond to a given category or subcategory identified in the taxonomy of the item catalog. As such, items belonging to the category or subcategory that are determined to be of interest to the user according to the user context may be selected to be included in the grouping. In addition, items belonging to a particular category and being associated with a given strategy 112 (e.g., past purchased item) can be selected to be included in the item grouping in association with the given strategy 112.

At box 421, the content selection engine 218 determines an order of presentation of the items. For example, the order of presentation of the items can be based at least in part on a likelihood that the user will be interested in the particular items based at least in part on the user context. In this example, the likelihood score for a given item can be determined by applying weights to various attributes of the item that are defined in the item selection models 221. In some examples, the content personalization models 224 may define whether the items are to be displayed in association with a given strategy (e.g. FIG. 1A). In this situation, the order of presentation for the items can be based at least in part on the likelihood the user will be interested in the particular items associated with a given strategy 112 and each strategy is arranged relative to one another according to the strategy ranking determined in box 415.

At box 424, the content selection engine 218 generates a user interface element for the given grouping. The user interface element can correspond to an object or container in a user interface 103 and can include the item listings 106 associated with the selected items. The item listings 106 are arranged in the user interface element according to the determined order of presentation such that the user sees the items determined to be of greatest relevance and/or interest prior to the items determined to be of least relevant and/or interest. According to various embodiments, the user interface element can comprise an aisle 109 or other type of content 115.

At box 427, the content selection engine 218 determines if there are other groupings in which a user interface element has not yet been created. If there are other groupings of items, the content selection engine 218 returns to box 409. Otherwise, the content selection engine 218 proceeds to box 430.

At box 430, the electronic commerce application 215 generates a user interface 103 with the generated user interface elements. The user interface elements are arranged within the user interface 103 according to the determined ranking of groupings from box 406. As such, the user interface element corresponding to the higher ranked grouping of items is displayed at a higher level (e.g., top of the page) on the user interface 103 than a lower ranked grouping of items. The user interface 103 can correspond to an item detail page, a search results page, a store landing page, an aisle landing page, and/or other type of page associated with the electronic commerce application 215 that includes listings of items available via the electronic commerce application 215.

At box 433, the electronic commerce application 215 causes the user interface 103 to be rendered on the client device 206. For example, the electronic commerce application 215 may transmit user interface code that can be executed by the client application 249 to generate and render the user interface 103 on the client device 206. In other examples, the electronic commerce application 215 can transmit the generated user interface 103 to the client device 206 for rendering. For example, the electronic commerce application can send data associated with the generated user interface 103 in response to an application programming interface (API) call from the client application 249. Thereafter, this portion of the process proceeds to completion.

Figure 5:
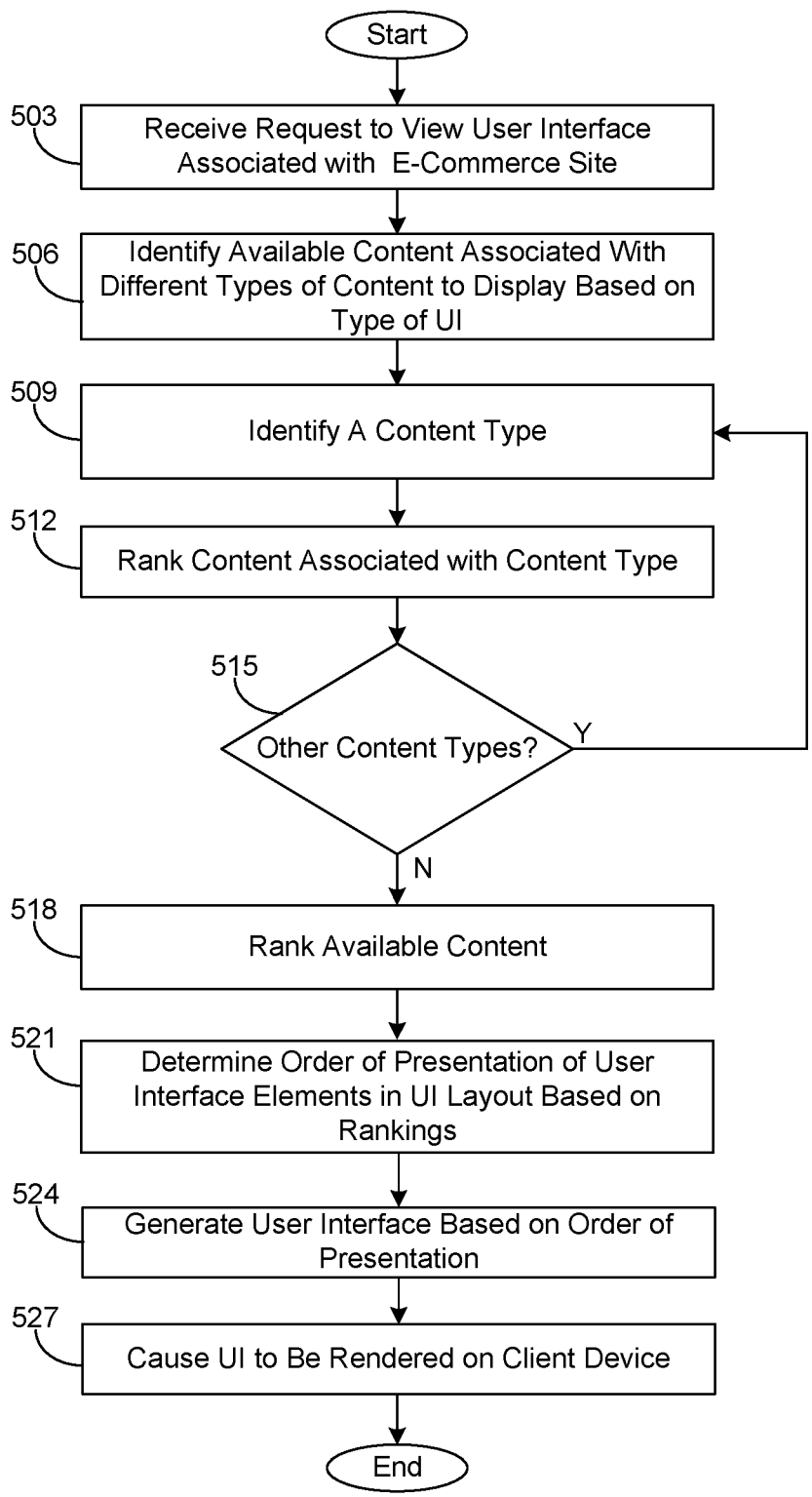

Referring next to FIG. 5, shown is a flowchart that provides one example of the operation of portions of the electronic commerce application 215 and the content selection engine 218, according to various embodiments. It is understood that the flowchart of FIG. 5 provides merely an example of the many different types of functional arrangements that may be employed to implement the operation of the portions of the electronic commerce application 215 and the content selection engine 218, as described herein. As an alternative, the flowchart of FIG. 5 may be viewed as depicting an example of elements of a method implemented in the computing environment 203 (FIG. 2) according to one or more embodiments.

Beginning with box 503, the electronic commerce application 215 receives a request to view a user interface 103 associated with an electronic commerce site provided by the electronic commerce application 215. For example, the user interface 103 may comprise an aisle-centric page that only contains item listings 106 for a given category or grouping of items, a past-purchases page that includes item listings 106 for past purchases, an item detail page, a search results page, and/or any other type of user interface 103.

At box 506, the content selection engine 218 may identify available content 115 that is associated with the different content types 245 to display based at least in part on the type of requested user interface 103. For example, the available content 115 included in a content library 118 may correspond to generated user interface elements corresponding to different aisles 109, recommendations 309, vendor provided content, advertisements 306, or other types of content.

At box 509, the content selection engine 218 identifies a type of content. For example, the content selection engine 218 may identify a content type associated with aisle 109, a recommendation 309, an advertisement 306, a vender provided content, or other type of content.

At box 512, the content selection engine 218 can rank the content included in a given content type 245. For example, the content type 245 may correspond to advertisements. The different advertisements 306 included in the content library 118 may be ranked according to scores generated and assigned to the different advertisements 306 according to the user context and the content personalization models 224. For example, an advertisement 306 for a meat related item may not score as high for a user account associated with a vegetarian as an advertisement for a meat-substitute related item. Each advertisement 306 can be assigned a score indicating a likelihood of interest and/or relevancy to the user account based at least in part on the user context.

At box 515, the content selection engine 218 determines if there are other content types 245. If there are other content types 245, the content selection engine 218 returns to box 509. Otherwise, the content selection engine 218 proceeds to box 518.

At box 518, the content selection engine 218 generates a second ranking of the content by ranking all of the available content according to the user context and content personalization models 224. For example, the scores assigned to each piece of content can be ranked from highest to lowest to indicate a likelihood that the user account will be reactive to the presented content. For example, while the aisles 109 may be ranked such that the dairy aisle is ranked first followed by the produce aisle 109 and the snack aisle 109, an advertisement 1 303a may have a score that is between the score for the dairy aisle 109 and the produce aisle 109. As such, the content selection engine 218 may determine that the advertisement 1 303a is ranked higher than the dairy aisle 109 and produce aisle 109.

At box 521, the content selection engine 218 determines an order of presentation for the different user interface elements associated with the different content that can be displayed. The order of presentation may be determined according to the first ranking of the content types 245 and the second ranking of all the available content 115. The order of placement in the layout of the user interface 103 indicates a likelihood of interest of the given content 115 to a user account based at least in part on the user context.

At box 524, the electronic commerce application 215 generates a user interface 103 with the generated user interface elements. The user interface elements are arranged within the user interface 103 according to the determined order of placement. As such, the user interface element corresponding to the higher ranked content is displayed at a higher level (e.g., top of the page) on the user interface 103 than a lower ranked content. The user interface 103 can correspond to an item detail page, a search results page, a store landing page, an aisle landing page, and/or other type of page associated with the electronic commerce application 215 that includes listings of items available via the electronic commerce application 215.

At box 527, the electronic commerce application 215 causes the user interface 103 to be rendered on the client device 206. For example, the electronic commerce application 215 may transmit user interface code that can be executed by the client application 249 to generate and render the user interface 103 on the client device 206. In other examples, the electronic commerce application 215 can transmit the generated user interface 103 to the client device 206 for rendering. For example, the electronic commerce application 215 can send data associated with the generated user interface 103 in response to an application programming interface (API) call from the client application 249. Thereafter, this portion of the process proceeds to completion.

Figure 6:
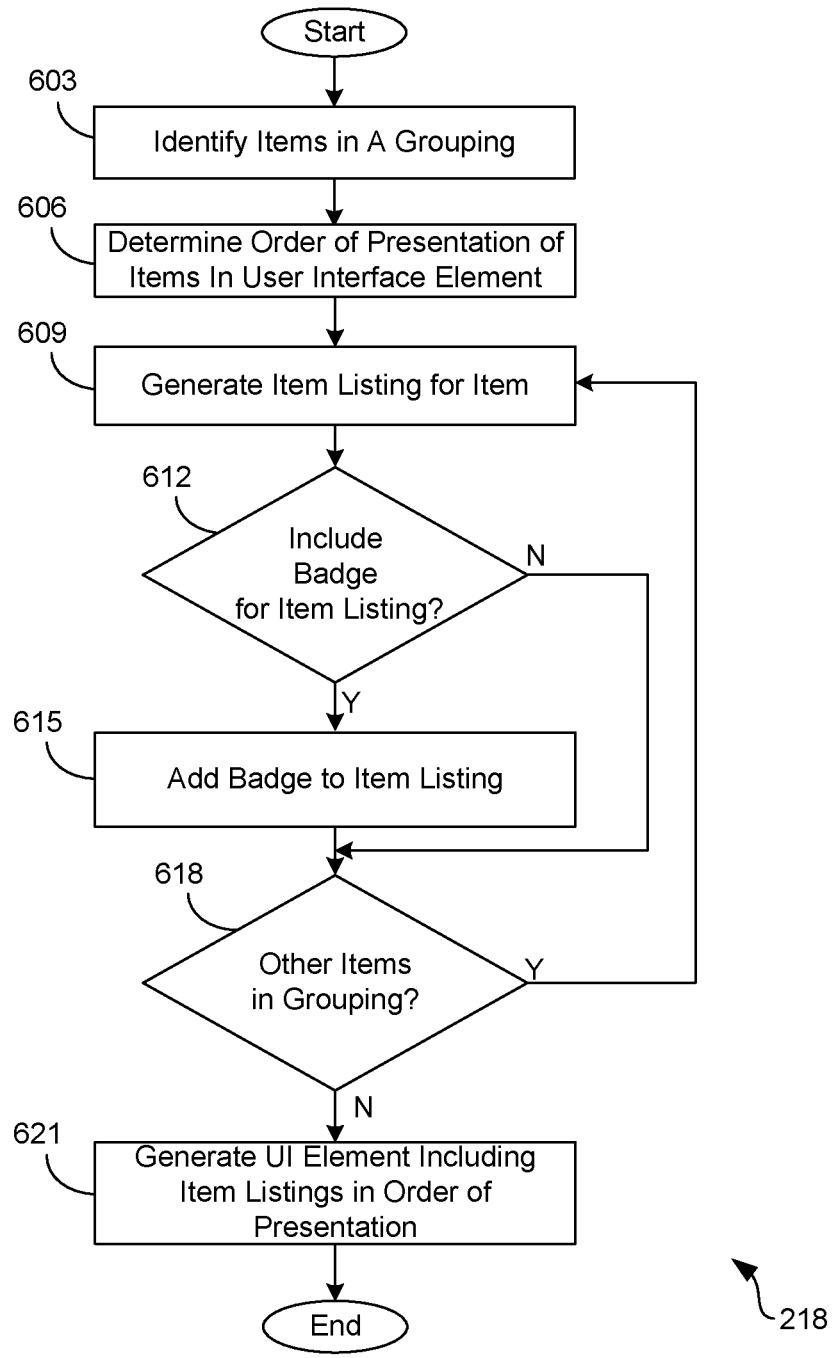

Referring next to FIG. 6, shown is a flowchart that provides one example of the operation of a portion of the content selection engine 218, according to various embodiments. It is understood that the flowchart of FIG. 6 provides merely an example of the many different types of functional arrangements that may be employed to implement the operation of the portion of the content selection engine 218, as described herein. As an alternative, the flowchart of FIG. 6 may be viewed as depicting an example of elements of a method implemented in the computing environment 203 (FIG. 2) according to one or more embodiments.

Beginning with box 603, the content selection engine 218 can identify items included in a grouping of items. For example, a grouping of items may correspond to a particular category of items as defined by the taxonomy of the item catalog 230. In this example, the grouping of items may correspond to "dairy items," "produce items," "beverages," "snacks," etc. As such, items belonging to the category or subcategory that are determined to be of interest to the user according to the user context may be included in the grouping. In addition, items belonging to a particular category and being associated with a given strategy 112 (e.g., past purchased items) can be included in the item grouping in association with the given strategy 112. In some examples, items that may not be included in a given category but are considered to be a complementary item to an item in a given category may still be included in a particular grouping of items. In another example, an item that may be on sale may be selected to be part of a grouping even though the item may not be associated with a particular item category.

At box 606, the content selection engine 218 can determine an order of presentation of item listings 106 corresponding to the identified items in a user interface element. For example, the order of presentation of the items can be based at least in part on a likelihood that the user will be interested in the particular items based at least in part on the user context. In this example, the likelihood score for a given item can be determined by applying weights to various attributes of the item that are defined in the item selection models 221. In some examples, the content personalization models 224 may define whether the items are to be displayed in association with a given strategy (e.g., FIG. 1A). In this situation, the order of presentation for the items can be based at least in part on the likelihood the user will be interested in the particular items associated with a given strategy 112 and each strategy is arranged relative to one another according to the strategy ranking determined in box 415.

At box 609, the content selection engine 218 generates an item listing 106 for a given item in the grouping of items. For example, the item listing 106 can include a visual icon that represents the item. The item listing 106 can further include additional information about the item such as, for example, an item price, an item title, and/or other information. In some examples, the item listing 106 includes a selectable component, that upon user interaction, redirects the user to an item detail page associated with the item. In some examples, the item listing 106 can include an add-to-cart component or one-click purchase component that upon selection facilitates the purchase of the item by the user account.

At box 612, the content selection engine 218 determines if a badge 303 is to be included with the item listing 106 based at least in part on whether the item is associated with a particular strategy 112. If a badge 303 is not to be included with the item listing 106, the content selection engine 218 proceeds to box 618. Otherwise, the content selection engine 218 proceeds to box 615.

At box 615, the content selection engine 218 adds an appropriate badge to the item listing 106. For example, if the item listing is selected for inclusion in the grouping based at least in part on a given strategy 112, a badge associated with the given strategy 112 is added to the item listing 106. The badge is a visual indicator and icon that can indicate to the user interacting with the electronic commerce application 215 the strategy 112 associated with the selection of the item in the grouping of items.

At box 618, the content selection engine 218 determines if there are other items included in the grouping of items. For example, the next item to analyze may be a next highest ranked item. In another example, the next item to analyze may be randomly selected from the remaining items to analyze. If other items are in the grouping of items, the content selection engine 218 returns to box 609. Otherwise, the content selection engine 218 proceeds to box 621.

At box 621, the content selection engine 218 generates a user interface element for the given grouping. The user interface element can correspond to an object or container in a user interface 103 and can include the item listings 106 associated with the selected items. The item listings 106 are arranged in the user interface element according to a determined order of presentation such that the user sees the items determined to be of greatest relevance and/or interest prior to the items determined to be of least relevant and/or interest. In addition, the item listings 106 that include a badge 303 indicating an associated strategy 112 are included in the user interface element. Thereafter, this portion of the process proceeds to completion.

Figure 7:
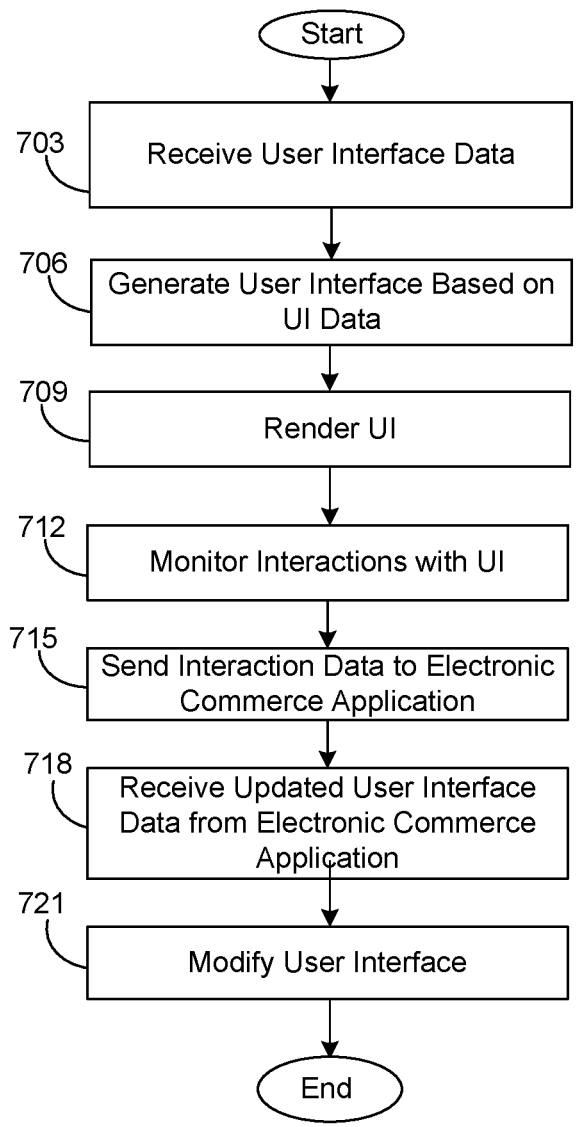
FIG. 7 is a flowchart illustrating one example of functionality implemented as a portion of a client application executed in a client device in the networked environment of FIG. 2 according to various embodiments of the present disclosure.

Referring next to FIG. 7, shown is a flowchart that provides one example of the operation of a portion of the client application 249, according to various embodiments. It is understood that the flowchart of FIG. 7 provides merely an example of the many different types of functional arrangements that may be employed to implement the operation of the portion of the client application 249, as described herein. As an alternative, the flowchart of FIG. 7 may be viewed as depicting an example of elements of a method implemented in the client device 206 (FIG. 2) according to one or more embodiments.

Beginning with box 703, the client application 249 receives user interface data and user interface code that is executable by the client application 249. The client application 249 receives the user interface data and user interface code from the electronic commerce application 215 or other appropriate application in the computing environment 203. In some examples, the client application 249 may receive the user interface data and/or the user interface code in response to an API call to the electronic commerce application 215 for the user interface data for generating user interfaces 103 associated with the electronic commerce application 215.

At box 706, the client application 249 generates a user interface 103 based on the user interface data received from the electronic commerce application 215. For examples, the client application 249 can execute the user interface code to generate the user interface 103 as defined by the user interface code and defined by the electronic commerce application 215 and/or the content selection engine 218.

At box 709, the client application 249 causes the user interface 103 to be rendered by the client device 206. As such, the user interface 103 can be displayed to the user associated with the client device 206 interacting with the electronic commerce application 215.

At box 712, the client application 249 monitors user interactions with the user interface 103 rendered on the client device 206. The interactions can include selection actions, scrolling actions, hovering actions, purchasing actions (e.g., adding to cart, one-click purchases), browsing actions, and/or other type of interactions that can be appreciated. The client application 249 can generate interaction data based on the user interactions and at box 715, the client application can send the interaction data to the electronic commerce application 215. The interaction data can be sent to the electronic commerce application 215 in real-time, periodically, or randomly.

At box 718, the client application 249 can receive user interface data from the computing environment 203 in response to sending the user interaction data. The user interface data can include data associated with a modified user interface 103 based on a detected change in the user context due to the monitored user interactions. The user interface data can also include data for generating an additional user interface 103, modifying the arrangement of content in a rendered user interface 103, and/or other types of data.

At box 721, the client application 249 can modify the user interface 103 based on the received user interface data. For examples, the client application 249 can execute the user interface code to generate the modified user interface 103 as defined by the user interface code and defined by the electronic commerce application 215 and/or the content selection engine 218. Upon modifying the user interface 103, the client application 249 causes the modified user interface 103 to be rendered by the client device 206. Thereafter, this portion of the process proceeds to completion.

Figure 8:
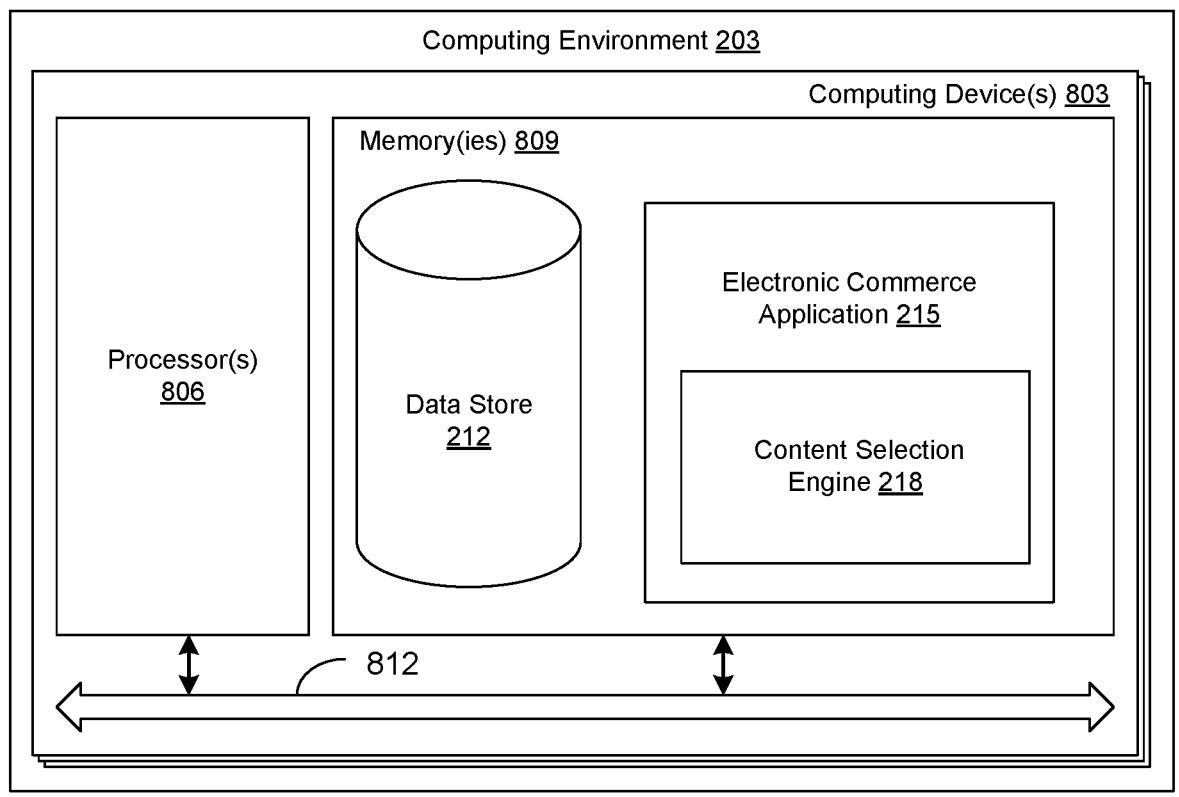
FIG. 8 is a schematic block diagram that provides one example illustration of a computing environment employed in the networked environment of FIG. 2 according to various embodiments of the present disclosure.

With reference to FIG. 8, shown is a schematic block diagram of the computing environment 203 according to an embodiment of the present disclosure. The computing environment 203 includes one or more computing devices 803. Each computing device 803 includes at least one processor circuit, for example, having a processor 806 and a memory 809, both of which are coupled to a local interface 812. To this end, each computing device 803 may comprise, for example, at least one server computer or like device. The local interface 812 may comprise, for example, a data bus with an accompanying address/control bus or other bus structure as can be appreciated.

Stored in the memory 809 are both data and several components that are executable by the processor 806. In particular, stored in the memory 809 and executable by the processor 806 are the electronic commerce application 215, the content selection engine 218, and potentially other applications. Also stored in the memory 809 may be a data store 212 and other data. In addition, an operating system may be stored in the memory 809 and executable by the processor 806.

It is understood that there may be other applications that are stored in the memory 809 and are executable by the processor 806 as can be appreciated. Where any component discussed herein is implemented in the form of software, any one of a number of programming languages may be employed such as, for example, C, C++, C #, Objective C, Java®, JavaScript®, Perl, PHP, Visual Basic®, Python®, Ruby, Flash®, or other programming languages.

A number of software components are stored in the memory 809 and are executable by the processor 806. In this respect, the term "executable" means a program file that is in a form that can ultimately be run by the processor 806. Examples of executable programs may be, for example, a compiled program that can be translated into machine code in a format that can be loaded into a random access portion of the memory 809 and run by the processor 806, source code that may be expressed in proper format such as object code that is capable of being loaded into a random access portion of the memory 809 and executed by the processor 806, or source code that may be interpreted by another executable program to generate instructions in a random access portion of the memory 809 to be executed by the processor 806, etc. An executable program may be stored in any portion or component of the memory 809 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 809 is defined herein as including both volatile and nonvolatile memory and data storage components. Volatile components are those that do not retain data values upon loss of power. Nonvolatile components are those that retain data upon a loss of power. Thus, the memory 809 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 806 may represent multiple processors 806 and/or multiple processor cores and the memory 809 may represent multiple memories 809 that operate in parallel processing circuits, respectively. In such a case, the local interface 812 may be an appropriate network that facilitates communication between any two of the multiple processors 806, between any processor 806 and any of the memories 809, or between any two of the memories 809, etc. The local interface 812 may comprise additional systems designed to coordinate this communication, including, for example, performing load balancing. The processor 806 may be of electrical or of some other available construction.

Although the electronic commerce application 215, the content selection engine 218, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 4-7 show the functionality and operation of an implementation of portions of the electronic commerce application 215, the content selection engine 218, and the client application 249. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 806 in a computer system or other system. The machine code may be converted from the source code, etc. If embodied in hardware, each block may represent a circuit or a number of interconnected circuits to implement the specified logical function(s).

Although the flowcharts of FIGS. 4-7 show a specific order of execution, it is understood that the order of execution may differ from that which is depicted. For example, the order of execution of two or more blocks may be scrambled relative to the order shown. Also, two or more blocks shown in succession in FIGS. 4-7 may be executed concurrently or with partial concurrence. Further, in some embodiments, one or more of the blocks shown in FIGS. 4-7 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the electronic commerce application 215, the content selection engine 218, and the client application 249, that comprises software or code can be embodied in any non-transitory computer-readable medium for use by or in connection with an instruction execution system such as, for example, a processor 806 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the electronic commerce application 215, the content selection engine 218, and the client application 249, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 803, or in multiple computing devices 803 in the same computing environment 203.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
   at least one computing device; and
   at least one application executable on the at least one computing device, wherein when executed, the at least one application causes the at least one computing device to at least:
   identify a first user account and a second user account interacting with an electronic commerce site;
   determine a first user context for the first user account and a second user context for the second user account;
   determine a first set of strategies for the first user account based at least in part on the first user context;

determine a second set of strategies for the second user account based at least in part on the second user context;

identify a first plurality of items available via the electronic commerce site and determined to be of interest to the first user account based at least in part on the first set of strategies;

identify a second plurality of items available via the electronic commerce site and determined to be of interest to the second user account based at least in part on the second set of strategies;

generate first content to display in a first user interface for the first user account based at least in part on the first set of strategies, the first content being divided among a first plurality of user interface elements according to a plurality of first categories, and a first user interface element of the first plurality of user interface elements including a first grouping of items associated with the first plurality of items;

generate second content to display in a second user interface for the second user account based at least in part on the second set of strategies, the second content being divided among a second plurality of user interface elements according to a plurality of second categories, a second user interface element of the second plurality of user interface elements including a second grouping of items associated with the second plurality of items, and a first subset of the plurality of first categories being different from a second subset of the plurality of second categories;

determine a first order of presentation of the first plurality of user interface elements for the first user interface; and determine a second order of presentation of the second plurality of user interface elements for the second user interface; and dynamically generate the first user interface based on the first order of presentation and the second user interface based at least in part on the second order of presentation.

2. The system of claim 1, wherein the first user interface and the second user interface are a same type of user interface.

3. The system of claim 1, wherein the first user interface element corresponds to a respective first category of items of the plurality of first categories, and when executed, the at least one application further causes the at least one computing device to at least:

select the first grouping of items from the first plurality of items based at least in part on the respective first category of items;

rank individual items in the first grouping of items based at least in part on the first user context and at least one content personalization rule;

determine a third order of presentation for the individual items in the first grouping of items; and generate the first user interface element to include a listing of the first grouping of items based at least in part on the third order of presentation.

4. The system of claim 1, wherein the first content and the second content comprises a plurality of different types of content, individual different types of content including at least one of: an item recommendation, an item advertisement, vendor provided content, or a respective grouping of items available via the electronic commerce site.

5. A method, comprising:

identifying, by at least one computing device, a plurality of item groupings associated with a presentation of items available via an electronic commerce site;

determining, by the at least one computing device, a ranking of the plurality of item groupings based at least in part on a user context;

selecting, by the at least one computing device, a respective subset of items in included in a respective item grouping of the plurality of items groupings based at least in part on at least one item selection model, the at least one item selection model determining one or more strategies for item selection according to the user context;

generating, by the at least one computing device, a plurality of user interface elements associated with the plurality of item groupings, individual user interface elements including the respective subset of items included in the respective item grouping of the plurality of item groupings; and generating a user interface including the plurality of user interface elements within the user interface according to the ranking of the plurality of item groupings.

6. The method of claim 5, further comprising determining, by the at least one computing device, the user context based at least in part on at least one of a brand of an entity associated with the electronic commerce site, a client device location, an entity location, a user eligibility status, a current item category, a type of user interface, a user interaction history, an aggregate user interaction history, an item availability, an occurrence of an event, a time, a date, a predefined list of items associated with a user account, or a seasonality.

7. The method of claim 5, wherein at least one item of the respective subset of items includes a badge representing a reason for selection of the at least one item in the respective item grouping based at least in part on the at least one item selection model.

8. The method of claim 5, further comprising selecting, by the at least one computing device, the respective subset of items from a plurality of items available via an electronic commerce system based at least in part on the at least one item selection model.

9. The method of claim 5, wherein the user interface includes a plurality of different types of content, and the plurality of user interface elements comprising a plurality of first user interface elements and corresponding to a first type of content of the plurality of different types of content.

10. The method of claim 9, wherein the plurality of different types of content include at least one of an item recommendation, an item advertisement, vendor provided content, or a grouping of items available via the electronic commerce site.

11. The method of claim 9, further comprising:

selecting, by the at least one computing device, the plurality of first user interface elements and a plurality of second user interface elements from a content library based at least in part on at least one content selection model, the plurality of second user interface elements comprising at least a second type of content that is different from the first type of content.

12. The method of claim 11, further comprising:

ranking, by the at least one computing device, the plurality of first user interface elements and the plurality of second user interface elements; and determining, by the at least one computing device, an order of presentation of the plurality of first user interface elements and the plurality of second user interface elements based at least in part on the at least one content selection model, and the user interface being generated based at least in part on the order of presentation.

13. The method of claim 5, further comprising receiving, by the at least one computing device, a request from a client device to view the user interface.

14. A system, comprising:
at least one computing device; and
at least one application executable in the at least one computing device, wherein when executed the at least one application causes the at least one computing device to at least:
determine one or more strategies for item selection based at least in part on a user context;
generate a plurality of user interface elements, at least one user interface element of the plurality of user interface elements including a respective plurality of item listings corresponding to a grouping of items, and the respective plurality of item listings included in the at least one user interface element being selected according to the one or more strategies and being arranged according to a first ranking of the respective plurality of item listings;
determine an order of presentation of the plurality of user interface elements based at least in part on a second ranking of the plurality of user interface elements; and
dynamically generate a user interface including the plurality of user interface elements positioned in a layout defined by the order of presentation.

15. The system of claim 14, wherein, when executed, the at least one application further causes the at least one computing device to at least identify a plurality of item groupings associated with a plurality of items available via an electronic commerce site based at least in part on the user context, the grouping of items being one of the plurality of item groupings.

16. The system of claim 15, wherein identifying the plurality of item groupings is based at least in part on a list of items known to be of interest to a user account.

17. The system of claim 15, wherein, when executed, the at least one application further causes the at least one computing device to at least select the respective plurality of item listings from the plurality of items to include in the grouping of items based at least in part on at least one item selection model and the one or more strategies.

18. The system of claim 14, wherein, when executed, the at least one application further causes the at least one computing device to at least rank the respective plurality of item listings to determine the first ranking, the first ranking being based at least in part on at least one item selection model.

19. The system of claim 14, wherein the second ranking is based at least in part on a user context, a type of content associated with a respective user interface element, and at least one content personalization rule.

20. The system of claim 14 wherein, when executed, the at least one application causes the at least one computing device to at least determine a user context based at least in part on at least one of a brand of an entity associated with an electronic commerce site, a client device location, an entity location, a user eligibility status, a current item category, a type of user interface, a user interaction history, an aggregate user interaction history, an item availability, an occurrence of an event, a time, a date, a predefined listing of items associated with a user account, or a seasonality.

* * * * *